(12) United States Patent
Goto

(10) Patent No.: US 6,845,646 B2
(45) Date of Patent: Jan. 25, 2005

(54) INTERFERENCE CHECKING DEVICE FOR A TRANSFER PRESS

(75) Inventor: Yoshinori Goto, Sagamihara (JP)

(73) Assignee: Aida Engineering Co., Ltd., Kanagawa (JP)

( * ) Notice: Subject to any disclaimer, the term of this patent is extended or adjusted under 35 U.S.C. 154(b) by 164 days.

(21) Appl. No.: 10/122,499

(22) Filed: Apr. 15, 2002

(65) Prior Publication Data
US 2003/0004604 A1 Jan. 2, 2003

(30) Foreign Application Priority Data
Jul. 2, 2001 (JP) ....................................... 2001-200671

(51) Int. Cl.[7] .............................................. B21D 43/05
(52) U.S. Cl. ..................... 72/20.1; 72/405.01
(58) Field of Search ......................... 72/405.01, 405.09, 72/405.11, 405.13, 405.16, 1, 20.1, 21.3

(56) References Cited

U.S. PATENT DOCUMENTS

| 5,231,860 A | * | 8/1993 | Tsuruta ........................... 72/21 |
| 5,934,125 A | * | 8/1999 | Takayama ......................... 72/1 |
| 5,970,763 A | * | 10/1999 | Takayama ......................... 72/1 |
| 6,481,345 B2 | * | 11/2002 | Nishida et al. ............... 72/451 |

FOREIGN PATENT DOCUMENTS

| EP | 0 491 948 | 7/1992 |
| EP | 0 830 921 | 9/1997 |

* cited by examiner

Primary Examiner—Daniel C. Crane
(74) Attorney, Agent, or Firm—Darby & Darby

(57) ABSTRACT

The setting of parameters in a transfer press is simplified by inputting pattern information to an interference checker. From the pattern information (stroke of each shaft, slide stroke and the like) the interference checker simulates the movement conditions of the die, fingers, and product shapes to check the interference status. The pattern information is sent to the transfer press. Also, interference is simulated for display or printing before actual press operation is required.

4 Claims, 6 Drawing Sheets

INTERFERENCE CHECKING DEVICE FOR A TRANSFER PRESS

BACKGROUND TO THE PRESENT INVENTION

The present invention relates to an interference checking device that checks for interference between the finger, die, and product during press operation in a press that has a transfer device in which the stroke and the like of each shaft (advance-return shaft, clamp-unclamp shaft, lift-down shaft) can be user-specified using a servo motor or a linear motor as a drive source.

By the movement of a pair of feed bars, a transfer press of the prior art conducts press working by holding and transporting material to sequential working stages. The manufacturers of such transfer presses provide an interference chart for the user. The interference chart shows the relationships between the position of the upper mold (slide) and the position of the finger (feed bar) during one rotation of the crank angle. In other words, the interference chart is drawn based on the slide stroke of the press and the strokes of each shaft (advance-return shaft, clamp-unclamp shaft, lift-down shaft) of the transfer device.

Referring to FIG. 5(A), an interference chart of the advance-return shaft is shown. Referring to FIG. 5(B), an interference chart for the clamp unclamp shaft (and in the case of three-dimensions, the lift-down shaft is added) is shown. Referring to FIG. 5(A), the horizontal axis is the stroke of the advance-return shaft (transfer feed stroke), and the vertical axis is the slide stroke of the press. The numerical values (0, 90, 180, 270) on the inside of the chart represent the crank angles. There are two interference charts (F-CUV1, F-CUV2) due to different strokes for the advance-return shaft (transfer feed stroke).

Referring to FIG. 5(B), the horizontal axis is the stroke of the clamp-unclamp shaft (clamp stroke), and the vertical axis is the slide stroke of the press. In a three-dimensional transport in which lift-down motion is conducted, the interference chart of the clamp-lift shaft has the added change in position of the finger (feed bar) during the lift-down motion (C-CUV1). In the case of two-dimensional transport, only the clamp-unclamp direction (C-CUV2) is shown.

Prior to acquiring a transfer press, the user requests from the manufacturer the desired press slide stroke and strokes for each shaft of the transfer device that correspond to the shape of the product to be press worked. In accordance with the desires of the user, the manufacturer provides the interference charts shown in FIGS. 5(A), 5(B). Based on the interference charts provided by the manufacturer, the user decides on the die layout and finger shape and manufactures these. However, due to design mistakes and the like, there is the risk of interference among the fingers, die and product. Therefore, after acquiring the transfer press, there the user must conduct its own interference check by operating the press slide very slowly with the die and fingers attached.

Transfer devices come in two types. A mechanical type uses the rotation of the crank shaft of the press as the drive source. An electrical type uses a servo motor or a linear motor as the drive source. In recent years, due to the rapid advance in electronic devices, the latter transfer device has become standard. In transfer devices of the mechanical type, changing the stroke of each shaft requires the cumbersome process of exchanging mechanical parts such as the cam and the like. In contrast, transfer devices that use servo motors or linear motors as the drive source permit the user to specify the length of the stroke of each shaft within a set range. Therefore, the stroke of each shaft can be changed easily, and a single transfer press can use several dies.

If, after the acquisition of a transfer press, the user decides on a certain stroke for each shaft of the transfer device, the creation of an interference chart, which requires a specialized technique, must be again requested from the manufacturer. This is very complicated. Furthermore, because the actual interference check for the die and the like is conducted after the manufacture of the die and the like, if there is interference, parts such as the die and the like must be reworked to correct the problem. This is extremely time-consuming. In other words, although the settings (stroke and the like for each shaft) for the transfer device are easily changed, the accompanying check for interference among the die, fingers, and product must be determined based on drawings. As a result, the procedure for determining the optimal transfer device settings that match the product (die, fingers) is complicated.

OBJECT AND SUMMARY OF THE INVENTION

The object of the present invention is to provide an interference checking device for a transfer press in which the interference check is conducted easily by the user.

The invention is an interference checking device for a transfer press. In order to conduct press working by a press that has a transfer device, the interference checking device for a transfer press checks for interference among fingers, die, and product while taking into consideration the slide stroke of the press and strokes for each shaft of the transfer device, comprising: a means for inputting pattern information, which is formed by transfer information, press information, and mold-related information; a means for storing patterns to store a plurality of pattern information that is inputted from the inputting means; a means for creating an interference chart to create an interference chart from one of the pattern information that is stored in the pattern storing means; a means for checking interference to determine whether or not fingers and dies interfere based on the interference chart created by the interference chart creating means; a means for processing output display to process the interference chart created by the interference chart creating means and the determination results of the interference checking means for output to an output device.

With the above invention, the interference checking device for the transfer press includes an inputting means for inputting pattern information based on transfer information (the stroke of each shaft, for example), press information (slide stroke, for example), and mold-related information (product shape, die shape, finger shape, and the like). The inputted pattern information is stored in the pattern storing means. Based on at least some of the pattern information stored in the pattern storing means, an interference chart is created. The interference checking means determines whether or not there is interference among the fingers, die, and product. The interference chart that is created and the determination results of the interference checking means is processed by the output display processing means. The result is outputted to a display or the like.

Because interference among the fingers, die, and product in the transfer press can be checked in this manner, the user can easily check for interference based on various pattern information without having to actually manufacture the die.

A further embodiment of invention is an interference checking device for a transfer press as described in above, wherein: from one of the pattern information stored in the pattern storing means, transfer information and press information are outputted to the transfer press.

With this embodiment of the invention, of the pattern information that is stored in the pattern storing means, the transfer information and the press information are outputted to the transfer press. In other words, the settings for the stroke of each shaft of the transfer press and the slide stroke of the press and the like do not have to be set again in the transfer press. In addition, the setting values (transfer information and press information) that have already been checked for interference can be selected and outputted. Therefore, in addition to the advantages of the above embodiment of the invention, the setting of the transfer press is more easily conducted.

A further embodiment of the invention is an interference checking device for a transfer press as described in the above embodiments, wherein: the interference chart creating means can also create a timing chart; and in addition, a current crank angle outputted from the press can be displayed on the timing chart that is displayed by the output display processing means.

With this embodiment of the invention, while the transfer press is moving, the current crank angle is displayed on the timing chart that represents the movement of the press slide and the feed bar. Therefore, in addition to the advantages of the inventions of the above embodiments, the movement of the transfer press is easy to understand.

The above, and other objects, features, and advantages of the present invention will become apparent from the following description read in conjunction with the accompanying drawings, in which like reference numerals designate the same elements.

DESCRIPTION OF THE PREFERRED
EMBODIMENTS

Figure 1:
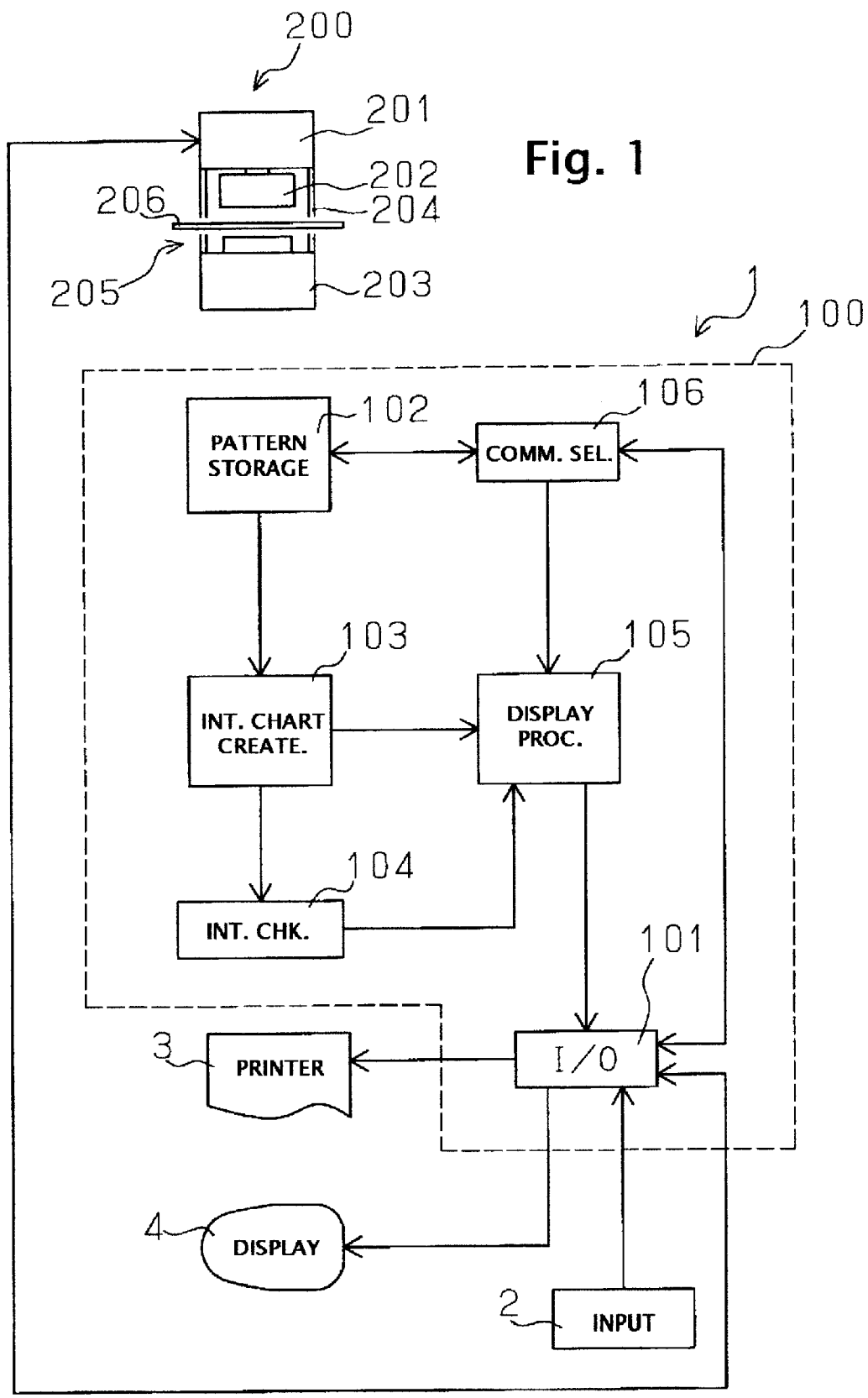
FIG. 1 is a block diagram of an interference checking device that is an embodiment of the present invention.

Referring to FIG. 1, an interference checking device 1 includes a main body 100 associated with a transfer press. An inputting means 2, a printer 3, and a display device 4 are electrically connected to the main body through an I/O port 101. The display device is of any convenient type, including, for example, a CRT display.

Interference checking device 1 in main body 100 is electrically connected to the transfer press 200 through the I/O port 101 to permit the exchange of signals.

Interference checking device 1 can be affixed to the main body (or the control panel) of press 200, or it can be installed remote from press 200.

Transfer press 200 has, as its main structural components, a crown 201 supporting a slide. 202. A bed 203 supports the base of columns 204 supporting crown 201 in its elevated position. A transfer device 205 has a servo motor, or a linear motor, as its drive source. A feed bar 206 is actuated by transfer device 205. By setting a variety of parameters, transfer device 205 can have a user-specified stroke within a set range.

Inputting means 2 may be based on a personal computer, for example. Inputting means preferably contains a graphics program such as a CAD system or the like. Pattern information formed from transfer information (stroke of each shaft, for example), press information (slide stroke, for example), and mold related information (product shape, die shape, finger shape, and the like, for example) are inputted through inputting means 2. Data consisting of numerical values such as stroke and the like are entered as numerical values. Data consisting of product shape, die shape, finger shape, and the like are entered as shape data by the CAD software. This pattern information is stored in a pattern storing means 102. The stored pattern information is given ID numbers. Preferably, pattern storing means 102 is capable of storing several sets of pattern information. Pattern storing means 102 is constructed, for example, from EPROM or the like which is read-write capable.

An interference chart creating means 103 is included in main body 100. Interference chart creating means creates an interference chart based on one of the sets of pattern information that is stored in pattern storing means 102. Interference chart creating means 103 creates an interference chart based on transfer information and press information of the pattern information. Interference chart creating means 103 is formed by describing in advance computational equations and the like in a computer program stored in ROM, for example. An interference checking means 104 is included in main body 100. Based on the interference chart created by interference chart creating means 103 and mold related information (product shape, die shape, finger shape, and the like), interference checking is conducted by a simulation of the movements of the product, die, and fingers. In other words, based on the pattern information, interference checking means 104 determines whether or not there is interference (collisions) among product, die, and fingers when the transfer press is operated. Interference checking means 104 is formed by describing in advance computational equations and the like in a computer program that is stored in ROM, for example.

Main body 100 of interference checking device 1 further includes an output display processing means 105. Output display processing means 105 outputs through the I/O port 101 the interference charts created by interference chart creating means 103 and the determination results of interference checking means 104 to printer 3 and display device 4. Output display processing means 105 is formed by describing in advance computational equations and the like in a computer program that is stored in ROM for example. In addition, each of the means described above is unified and maintained by a command-select means 106. Alternatively, based on commands that an operator inputs through inputting means 2, command-select means 106 sends a command signal to each of the means, and the specified processing is conducted.

Figure 2:
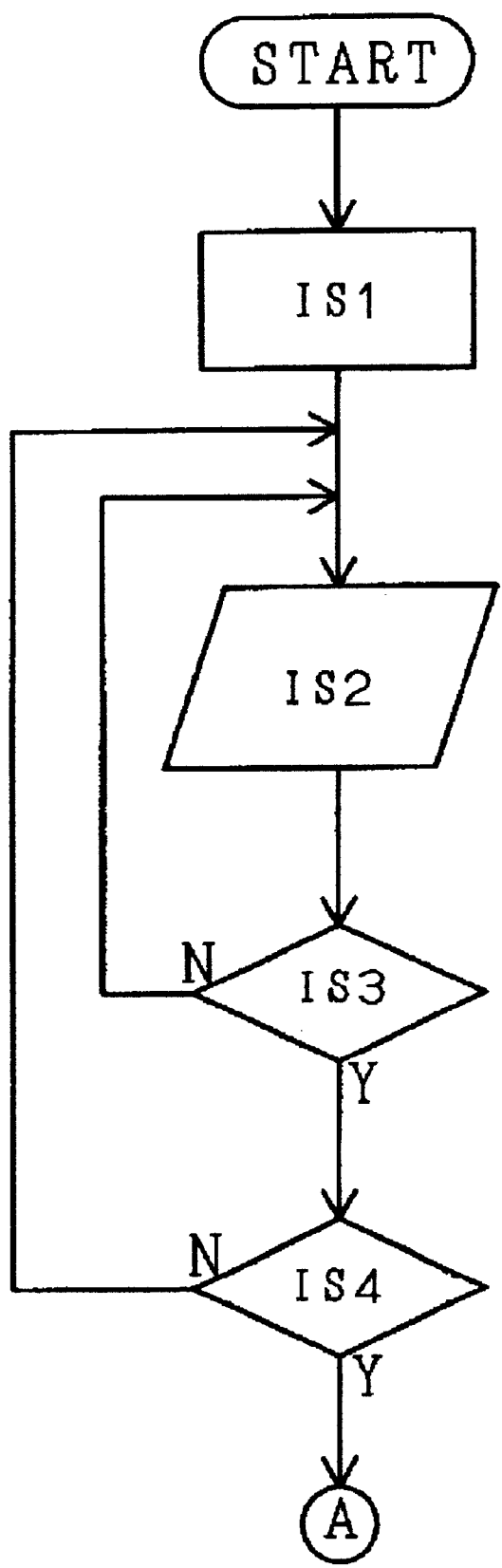
FIG. 2 is a flow chart for input of pattern information in an embodiment of the present invention.

Referring to FIG. 2, an input flow chart of pattern information is shown. In order to input pattern information, inputting means 2 selects an input mode. An input mode is the mode to be used for inputting pattern information (IS1). By operating keys and the like, pattern information is inputted (IS2). A certain number of sets of pattern information are stored in pattern storing means 102 (IS3). After the inputting and storing of pattern information is completed (IS4), processing transitions to an interference checking mode (Part A of FIGS. 2 and 3).

Figure 3:
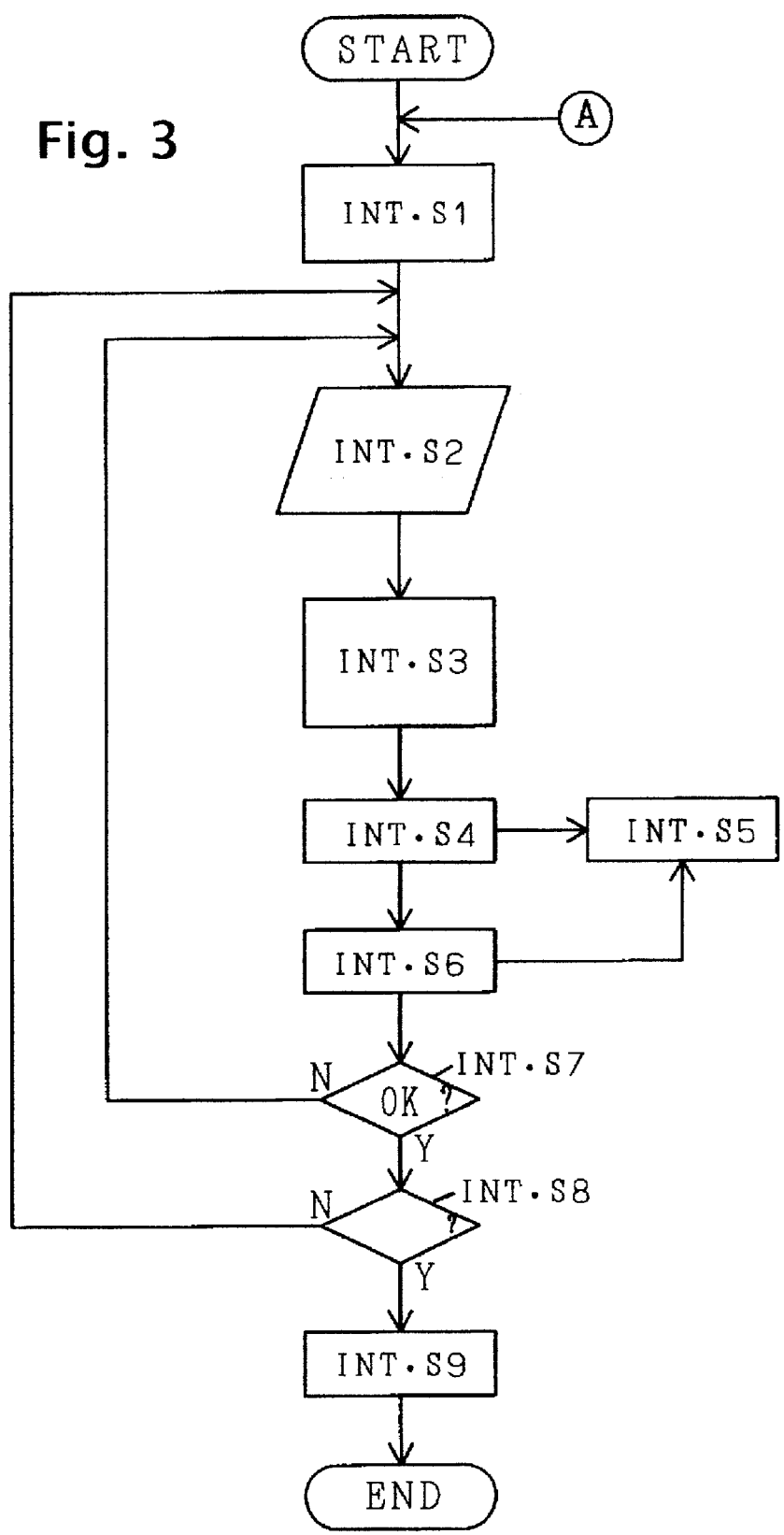
FIG. 3 is a flow chart for an interference check in an embodiment of the present invention.

Referring to FIG. 3, the interference checking mode, which checks for interference, is selected (INT. S1). The option is selected of either using pattern information stored in pattern storing means 102 or inputting pattern information (INT. S2). If pattern information is to be recalled from the pattern information stored in pattern storing means 102, the ID number identifying the pattern is inputted into inputting means 2. Thereupon, the pattern information for the inputted ID number is selected from pattern storing means 102 by command-select means 106 via I/O port 101. The selected pattern information is sent to interference chart creating means 103 (INT. S3). Interference chart creating means 103 produces an interference chart based on the transfer information and press information from the pattern information (INT. S4). A check for interference is made based on the interference chart that is created, together with the mold related information from the pattern information (INT.S6). The interference chart that is created and the results of interference determination are outputted to output display processing means 105. Information on the selection of the output device (printer 3, display device 4) decided by the user is inputted from inputting device 2 via I/O port 101 to output display processing means 105 by command-select means 106. At output display processing means 105, the interference chart and determination results are outputted to an output device specified by the user (INT. S5). Depending on the mode of implementation, a three-dimensional image of the fingers, die (upper mold) and product is displayed by output display processing means 105. Their movements are simulated, and the interference conditions are visually confirmed.

Based on the interference determination results, the operator can correct the pattern information (INT. S7). If the interference determination results are good, the pattern information is confirmed (INT. S9). This pattern information can be sent to transfer press 200 via I/O port 101 (INT. S9). Based on this pattern information, transfer press 200 can move slide 202 and feed bar 206 and the like.

The pattern information can be corrected at any time after it is input. After correction, a new simulation is conducted. In other words, even if a die and the like are not actually manufactured, the interference status can be easily checked.

Depending on the type of transfer press, the transfer information can be information of the entire material delivery device including, for example, a destack feeder or a leveler feeder or the like.

In order to prevent actual operation of the transfer press and its peripheral devices at settings where there is interference among the fingers, die, and product, an interlock circuit (not shown) is built into a control device.

Figure 4:
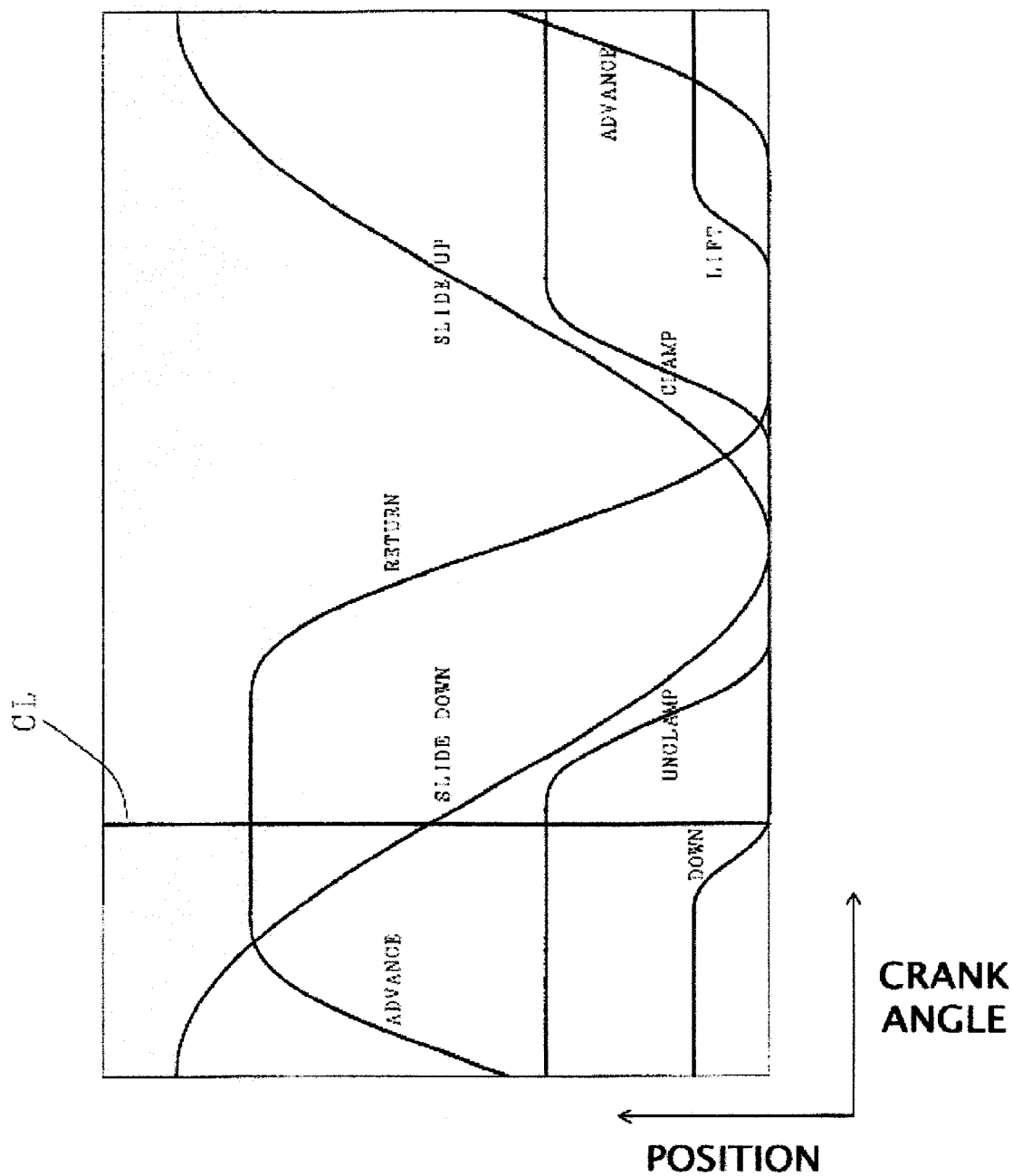
FIG. 4 is a timing chart showing the current positions of a slide and a feed bar at the current crank angle in an embodiment of the present invention.
Figure 5:
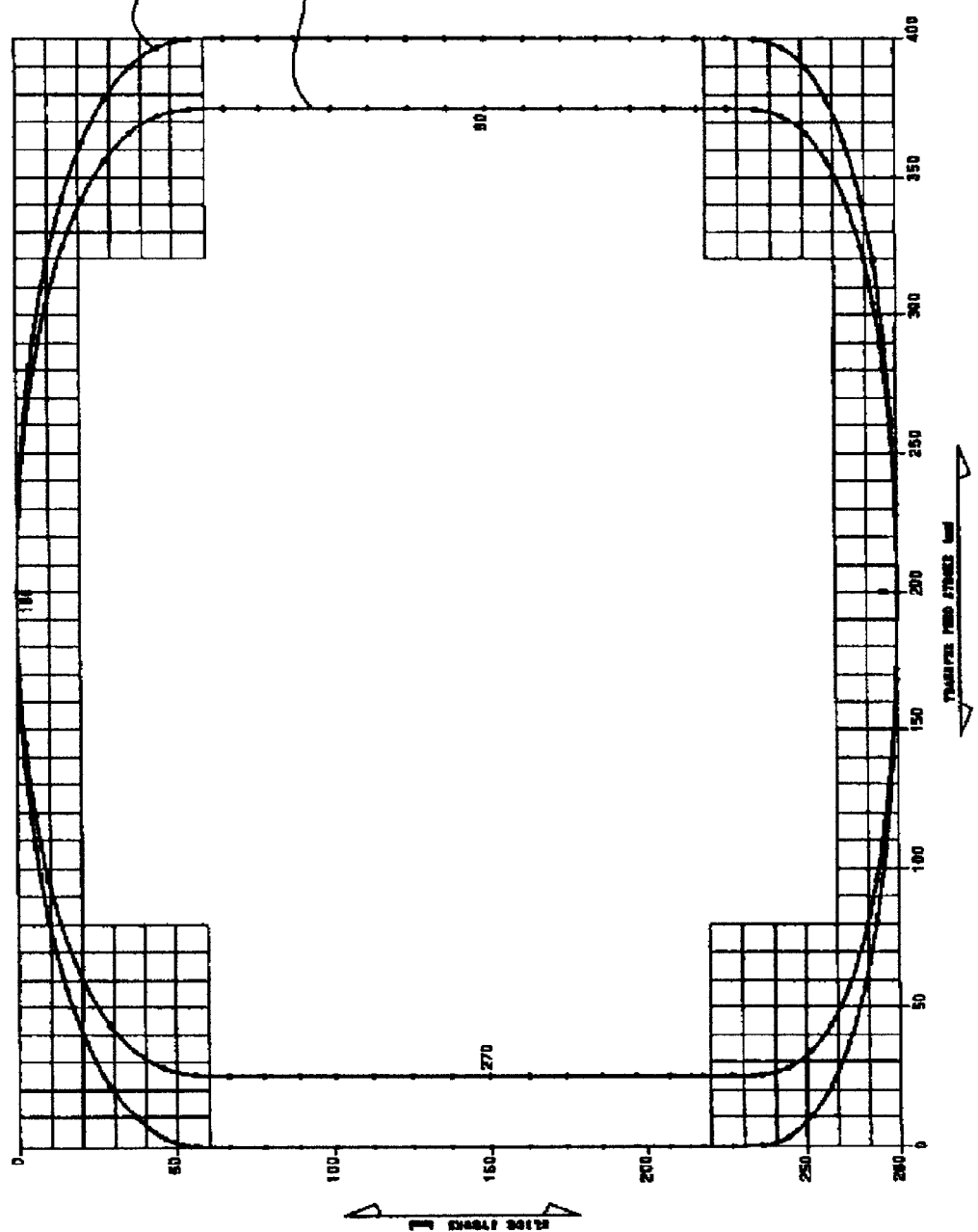
FIG. 5(A) is an interference chart of fingers and upper mold in the transfer direction.
FIG. 5(B) is an interference chart of the upper mold with respect to the clamp.
Figure 5:
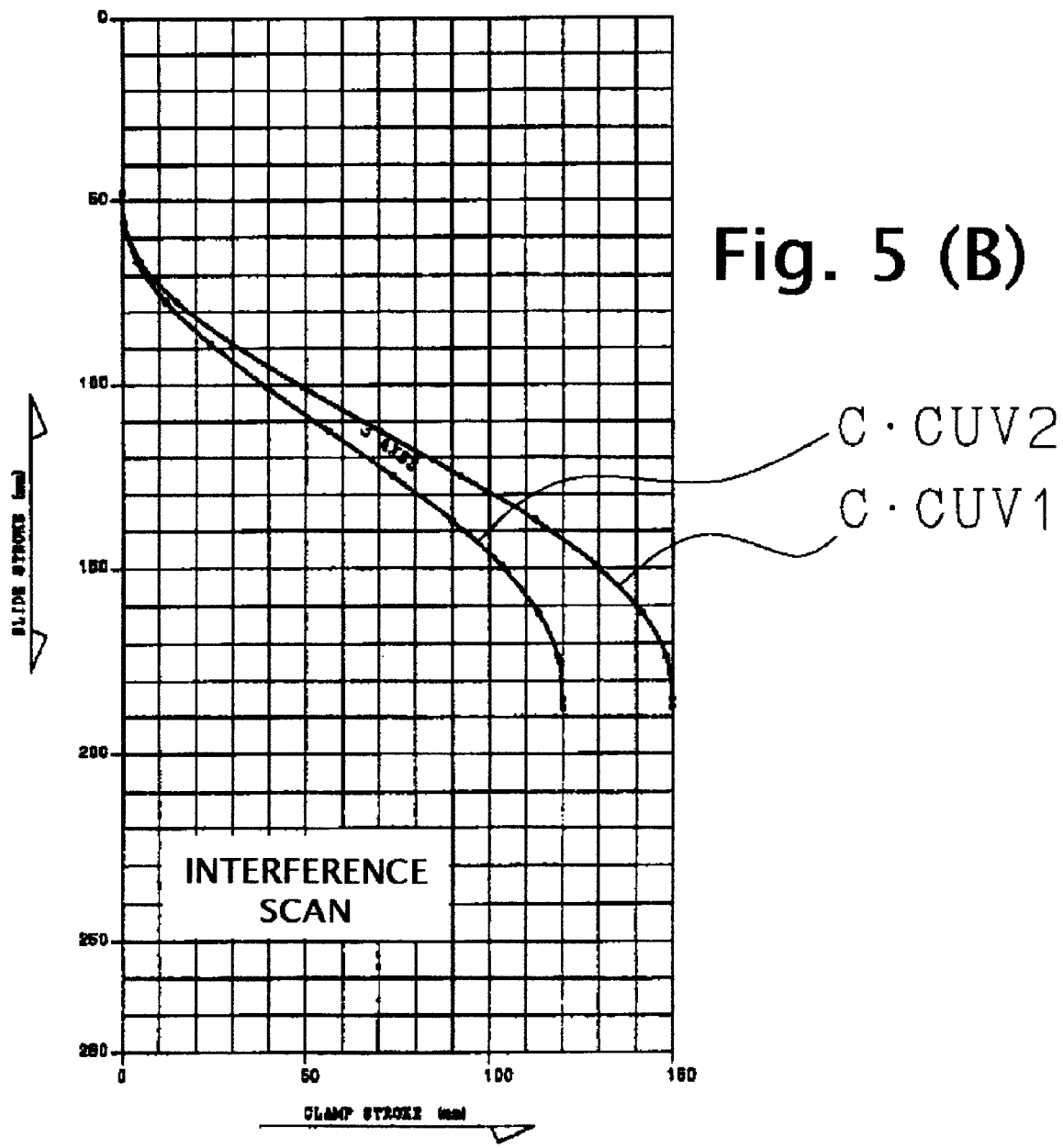

Furthermore, interference chart creating means 103 can be formed to create a timing chart as shown in FIG. 4. The created timing chart is outputted to output display processing means 105. During the operation of transfer press 200, the current crank angle is inputted into interference checking device 1 (main body 100) via I/O port 101. A command signal is sent by command-select means 106 to output display processing means 105 to display the inputted current crank angle on the timing chart. Thereupon, referring to FIG. 4, the current crank angle is displayed as a line CL on display device 4. Together with the operation of the transfer press, line CL moves to the right of FIG. 5 moment by moment. By forming interference checking device 1 in this manner, the positions of slide 202 and feed bar 206 at the current crank angle can be readily seen. For example, when there is an emergency stoppage of transfer press 200, the position of each driving part is easily known, and there can be a quick and safe response.

According to the invention in claim 1, the user can easily conduct interference checks when the stroke of the shafts of the transfer device or the stroke of the press is changed. Furthermore, because it is not necessary to actually manufacture the die and the like in order to conduct the interference checks, interference checks can be conducted even at places separate from the transfer press. Work by several people can be conducted efficiently. In other words, the workload for designing dies and the like is reduced.

According to the invention in claim 2, the data inputted for the interference check can be sent to the transfer press. As a result, the data setup for the transfer press is conducted more reliably and easily. According to the invention in claim 3, during transfer press operation, the current positions for the driving parts (slide, feed bar and the like) are easily known. As a result, when there is an emergency stoppage for example, there can be a swift and safe response.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An interference checking device for a transfer press comprising:

an inputting means for inputting pattern information consisting of transfer information, press information, and mold-related information;

pattern storing means for storing a plurality of sets of pattern information from said inputting means;

a processor; and a memory storing processing instructions for controlling the processor, the processor operative with the processing instructions to:

create an interference chart from one set of said pattern information in said pattern storing means; and check interference to determine whether a product, fingers and dies in said transfer press interfere based on said interference chart; and an output display processing means for producing an output for reproducing said interference chart and determination results of said interference check.

2. An interference checking device for a transfer press as described in claim 1, wherein transfer information and press information from said one set of said pattern information stored in said pattern storing means can be output to said transfer press.

3. An interference checking device for a transfer press according to claim 1 wherein:

the processor is further operative with the processing instructions to create a timing chart; and said output display processing means can display said timing chart and a current crank angle on said timing chart.

4. An interference checking device for a transfer press according to claim 3 wherein said timing chart represents movement of a press slide and a feed bar in said transfer press.

* * * * *